(12) United States Patent
Murali et al.

(10) Patent No.: US 12,318,935 B2
(45) Date of Patent: Jun. 3, 2025

(54) TECHNIQUES FOR ROBOT CONTROL USING NEURAL IMPLICIT VALUE FUNCTIONS

(71) Applicant: NVIDIA CORPORATION, Santa Clara, CA (US)

(72) Inventors: Adithyavairavan Murali, Seattle, WA (US); Balakumar Sundaralingam, Seattle, WA (US); Yun-Chun Chen, Toronto (CA); Dieter Fox, Seattle, WA (US); Animesh Garg, Berkeley, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 322 days.

(21) Appl. No.: 17/856,699

(22) Filed: Jul. 1, 2022

(65) Prior Publication Data

US 2023/0256595 A1 Aug. 17, 2023

Related U.S. Application Data

(60) Provisional application No. 63/309,946, filed on Feb. 14, 2022.

(51) Int. Cl.
 *B25J 9/16* (2006.01)

(52) U.S. Cl.
 CPC ............. *B25J 9/163* (2013.01); *B25J 9/161* (2013.01); *B25J 9/1653* (2013.01); *B25J 9/1666* (2013.01); *B25J 9/1669* (2013.01); *B25J 9/1697* (2013.01)

(58) Field of Classification Search
CPC . B25J 9/163; B25J 9/161; B25J 9/1653; B25J 9/1666; B25J 9/1669; B25J 9/1697; B25J 9/1612
See application file for complete search history.

(56) References Cited

U.S. PATENT DOCUMENTS

| | | | |
|---|---|---|---|
| 2015/0100194 A1* | 4/2015 | Terada | G05D 1/0214 701/25 |
| 2021/0060774 A1* | 3/2021 | Butterfoss | B25J 9/1666 |
| 2021/0276187 A1* | 9/2021 | Tang | G06N 3/08 |
| 2021/0365032 A1* | 11/2021 | Ichnowski | G06N 3/045 |
| 2022/0019762 A1* | 1/2022 | Kosuge | B25J 13/089 |

(Continued)

OTHER PUBLICATIONS

M. Bhardwaj, et al., "Storm: An integrated framework for fast joint-space model-predictive control for reactive manipulation," 2021, 10 pages.

(Continued)

*Primary Examiner* — Adam R Mott
*Assistant Examiner* — Heather J Keniry
(74) *Attorney, Agent, or Firm* — Artegis Law Group, LLP (57) ABSTRACT

One embodiment of a method for controlling a robot includes receiving sensor data associated with an environment that includes an object; applying a machine learning model to a portion of the sensor data associated with the object and one or more trajectories of motion of the robot to determine one or more path lengths of the one or more trajectories; generating a new trajectory of motion of the robot based on the one or more trajectories and the one or more path lengths; and causing the robot to perform one or more movements based on the new trajectory.

23 Claims, 5 Drawing Sheets

(56) References Cited

U.S. PATENT DOCUMENTS

2022/0276657 A1* 9/2022 Huh ................ G05D 1/0246
2023/0294292 A1* 9/2023 Ono ................. B25J 9/1697
                                                        700/259

OTHER PUBLICATIONS

Y. Xiang, et al., "Posecnn: A convolutional neural network for 6d object pose estimation in cluttered scenes," in RSS, 2018, 10 pages.
S. M. Lavalle, et al., "Rapidly-exploring random trees: Progress and prospects," Algorithmic and computational robotics: new directions, 2001.

* cited by examiner

TECHNIQUES FOR ROBOT CONTROL USING NEURAL IMPLICIT VALUE FUNCTIONS

CROSS-REFERENCE TO RELATED APPLICATIONS

This application claims priority benefit of the United States Provisional Patent Application titled, "TECHNIQUES FOR ENCODING ROBOT TASK TRAJECTORIES AS NEURAL IMPLICIT VALUE FUNCTIONS," filed on Feb. 14, 2022, and having Ser. No. 63/309,946. The subject matter of this related application is hereby incorporated herein by reference.

BACKGROUND

Technical Field

Embodiments of the present disclosure relate generally to computer science and robotics and, more specifically, to techniques for robot control using neural implicit value functions.

Description of the Related Art

Robots are being increasingly used to perform tasks automatically in various environments. In many automated applications, one important task that a robot has to be controlled to perform is grasping an object. For example, in a factory setting, a robot could be controlled to grasp an object being manufactured prior to moving the object or otherwise interacting with or performing operations on the object.

Conventional techniques for controlling a robot to grasp an object typically divide the grasping task into two separate steps. The first step involves detecting the position of the object that the robot needs to grasp. The second step uses a motion planning technique to determine a path that starts from the current position of the robot and ends at the position of the object. Once that path is determined, the robot is controlled to move along the determined path and grasp the object.

One drawback of the above two-step approach is that the approach is computationally complex and, accordingly, takes a fair amount of processing time. As a result, a robot usually can be controlled to grasp only static objects, such as objects on a table top or inside a bin, using the above two-step approach. When objects are moving relative to the robot, such as when the objects are on a conveyor belt or in a production line, paths from the robot to the objects cannot be recomputed quickly enough using the above two-step approach to react to the movements of the objects. Accordingly, as a general matter, a robot cannot be controlled to grasp moving objects using the above two-step approach.

As the foregoing illustrates, what is needed in the art are more effective techniques for controlling robots to grasp moving objects.

SUMMARY

One embodiment of the present disclosure sets forth a computer-implemented method for controlling a robot. The method includes receiving sensor data associated with an environment that includes an object. The method further includes applying a machine learning model to a portion of the sensor data associated with the object and one or more trajectories of motion of the robot to determine one or more path lengths of the one or more trajectories. The method also includes generating a new trajectory of motion of the robot based on the one or more trajectories and the one or more path lengths. In addition, the method includes causing the robot to perform one or more movements based on the new trajectory.

Another embodiment of the present disclosure sets forth a computer-implemented method for controlling a robot. The method includes generating a plurality of first trajectories. The method further includes, for each trajectory included in the plurality of first trajectories, applying a first machine learning model to the trajectory and sensor data associated with an object to generate a path length associated with the trajectory. The method also includes generating a second trajectory based on the plurality of first trajectories and the path lengths associated with the plurality of first trajectories. In addition, the method includes causing the robot to perform one or more movements based on the second trajectory Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques are substantially more computationally efficient relative to prior art approaches, which enables the disclosed techniques to be used to control robots when those robots are grasping objects that are moving relative to the robots, such as objects on a conveyor belt or in a production line. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for controlling a robot to grasp objects. In the improved techniques, a machine learning model is trained to output a path length indicating how far a given configuration of the robot is from grasping an object. In addition, another machine learning model is trained to determine whether a given configuration of the robot is colliding with an object. Subsequent to training, at each of a number of time steps until the robot grasps an object, a sample of random trajectories is generated and evaluated using the trained machine learning models. A weighted average of the random trajectories is computed based on the evaluation results. Then, a robot is controlled to move according to a first time step in the weighted average of the random trajectories.

The techniques for controlling a robot to grasp objects have many real-world applications. For example, those techniques could be used to control a robot to grasp objects on a conveyor belt. As another example, those techniques could be used to control a robot to grasp objects on a production line in a manufacturing facility.

The above examples are not in any way intended to be limiting. As persons skilled in the art will appreciate, as a general matter, the techniques for controlling robots to grasp objects described herein can be implemented in any suitable application.

System Overview

Figure 1:
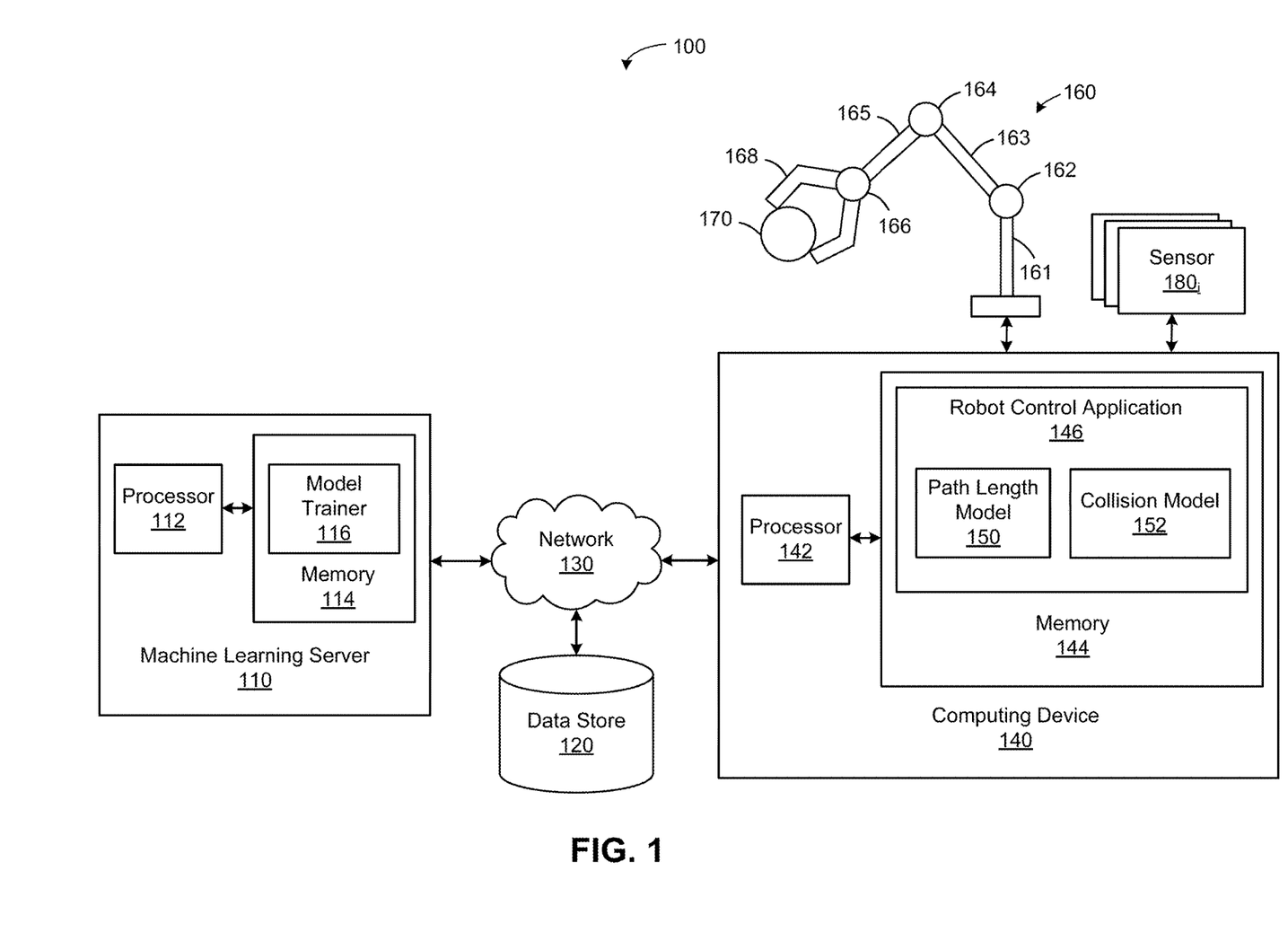
FIG. 1 is a block diagram illustrating a computer system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network. In addition, the system 100 includes a robot 160 and one or more sensors 180, (referred to herein collectively as sensors 180 and individually as a sensor 180) that are in communication with the computing device 140 (e.g., via a similar network). In some embodiments, the sensors can include one or more RGB (red, green, blue) cameras and optionally one or more depth cameras, such as cameras using time-of-flight sensors, LIDAR (light detection and ranging) sensors, etc.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a path length model 150 and a collision model 152. Given the state of an object in the environment and a current configuration of a robot, the path length model 150 generates a prediction of a path length to the object, and the collision model 152 predicts whether the current configuration of the robot collides with the object. Techniques for training the path length model 150 and the collision model 152 are discussed in greater detail below in conjunction with FIGS. 3-4. Training data and/or trained machine learning models, including the path length model 150 and the collision model 152, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

As shown, a robot control application 146 that utilizes the path length model 150 and the collision model 152 is stored in a memory 144, and executes on a processor 142, of the computing device 140. Once trained, the path length model 150 and the collision model 152 can be deployed, such as via robot control application 146, to control a robot 160 to grasp objects, given sensor data captured by the sensor(s) 180, as discussed in greater detail below in conjunction with FIGS. 3 and 5. Illustratively, the robot 160 includes multiple links 161, 163, and 165 that are rigid members, as well as joints 162, 164, and 166 that are movable components that can be actuated to cause relative motion between adjacent links. In addition, the robot 160 includes a gripper 168, which is the last link of the robot 160 and can be controlled to grip an object, such as object 170. Although an exemplar robot 160 is shown for illustrative purposes, techniques disclosed herein can be employed to control any suitable robot.

Figure 2:
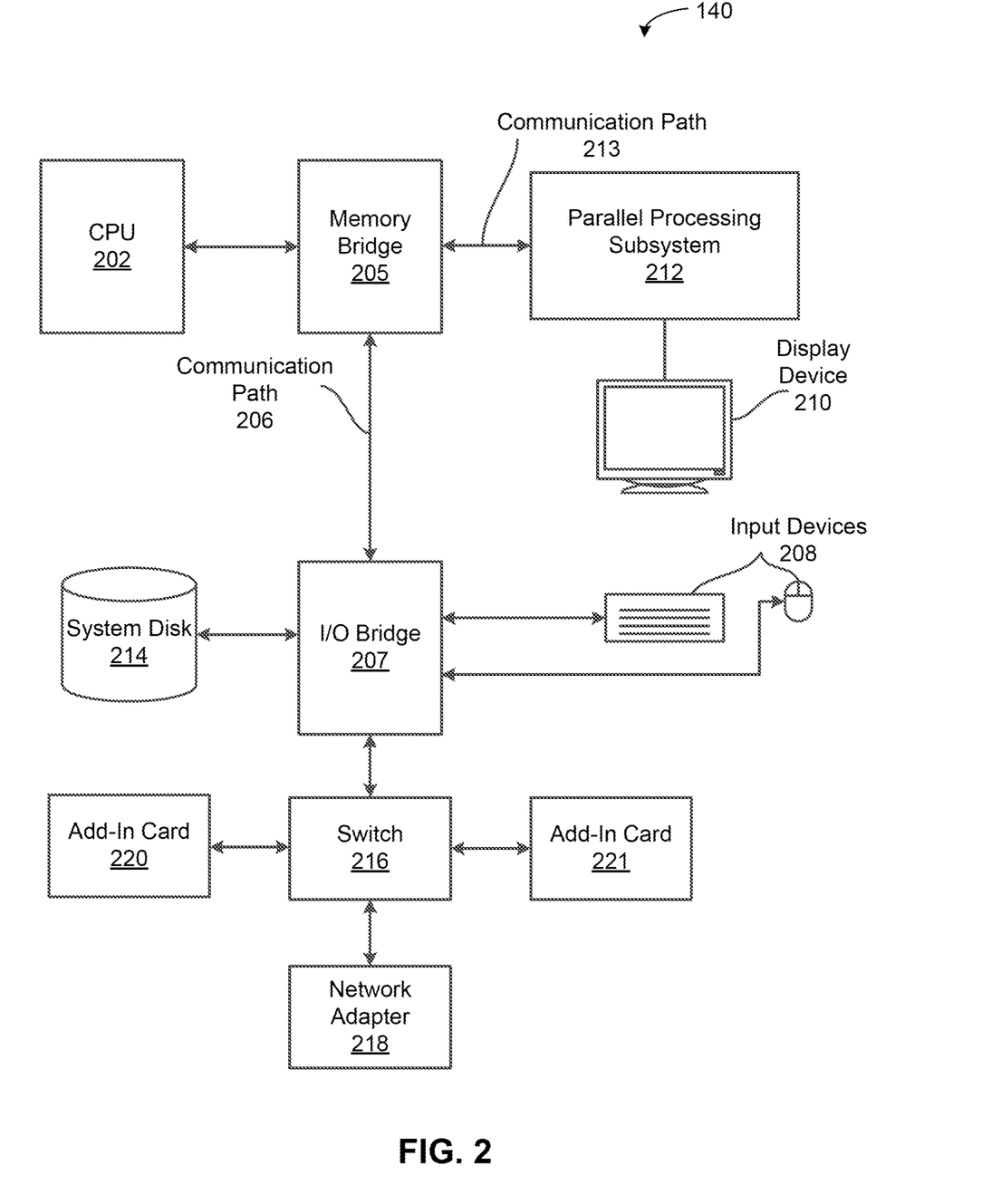
FIG. 2 is a block diagram of a parallel processing unit included in the parallel processing subsystem of FIG. 1, according to various embodiments.

FIG. 2 is a block diagram illustrating the computing system 140 in greater detail, according to various embodiments. As persons skilled in the art will appreciate, computing device 140 can be any type of technically feasible computer system, including, without limitation, a server machine, a server platform, a desktop machine, laptop machine, a hand-held/mobile device, or a wearable device. In some embodiments, computing device 140 is a server machine operating in a data center or a cloud computing environment that provides scalable computing resources as a service over a network. In some embodiments, the machine learning server 110 can include similar components as the computing system 140.

In various embodiments, the computing device 140 includes, without limitation, the processor 142 and the memory 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard or a mouse, and forward the input information to processor 142 for processing via communication path 206 and memory bridge 205. In some embodiments, computing device 140 may be a server machine in a cloud computing environment. In such embodiments, computing device 140 may not have input devices 208. Instead, computing device 140 may receive equivalent input information by receiving commands in the form of messages transmitted over a network and received via the network adapter 218. In one embodiment, switch 216 is configured to provide connections between I/O bridge 207 and other components of the computing device 140, such as a network adapter 218 and various add-in cards 220 and 221.

In one embodiment, I/O bridge 207 is coupled to a system disk 214 that may be configured to store content and applications and data for use by processor 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 212. In other embodiments, the parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 144 includes at least one device driver configured to manage the processing operations of the one or more PPUs within parallel processing subsystem 212. In addition, the system memory 144 includes a rendering application 230. The rendering application 230 can be any technically-feasible application that renders virtual 3D scenes, and rendering the scenes can include rendering SDFs according to techniques disclosed herein. For example, the rendering application 230 could be a gaming application or a rendering application that is used in film production. Although described herein primarily with respect to the rendering application 230, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 1 to form a single system. For example, parallel processing subsystem 212 may be integrated with processor 142 and other connection circuitry on a single chip to form a system on chip (SoC).

In one embodiment, processor 142 is the master processor of computing device 140, controlling and coordinating operations of other system components. In one embodiment, processor 142 issues commands that control the operation of PPUs. In some embodiments, communication path 213 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 could be connected to processor 142 directly rather than through memory bridge 205, and other devices would communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 1 may not be present. For example, switch 216 could be eliminated, and network adapter 218 and add-in cards 220, 221 would connect directly to I/O bridge 207. Lastly, in certain embodiments, one or more components shown in FIG. 1 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 could be implemented as a virtual graphics processing unit (GPU) that renders graphics on a virtual machine (VM) executing on a server machine whose GPU and other physical resources are shared across multiple VMs.

Controlling Robots Using Neural Implicit Value Functions

Figure 3:
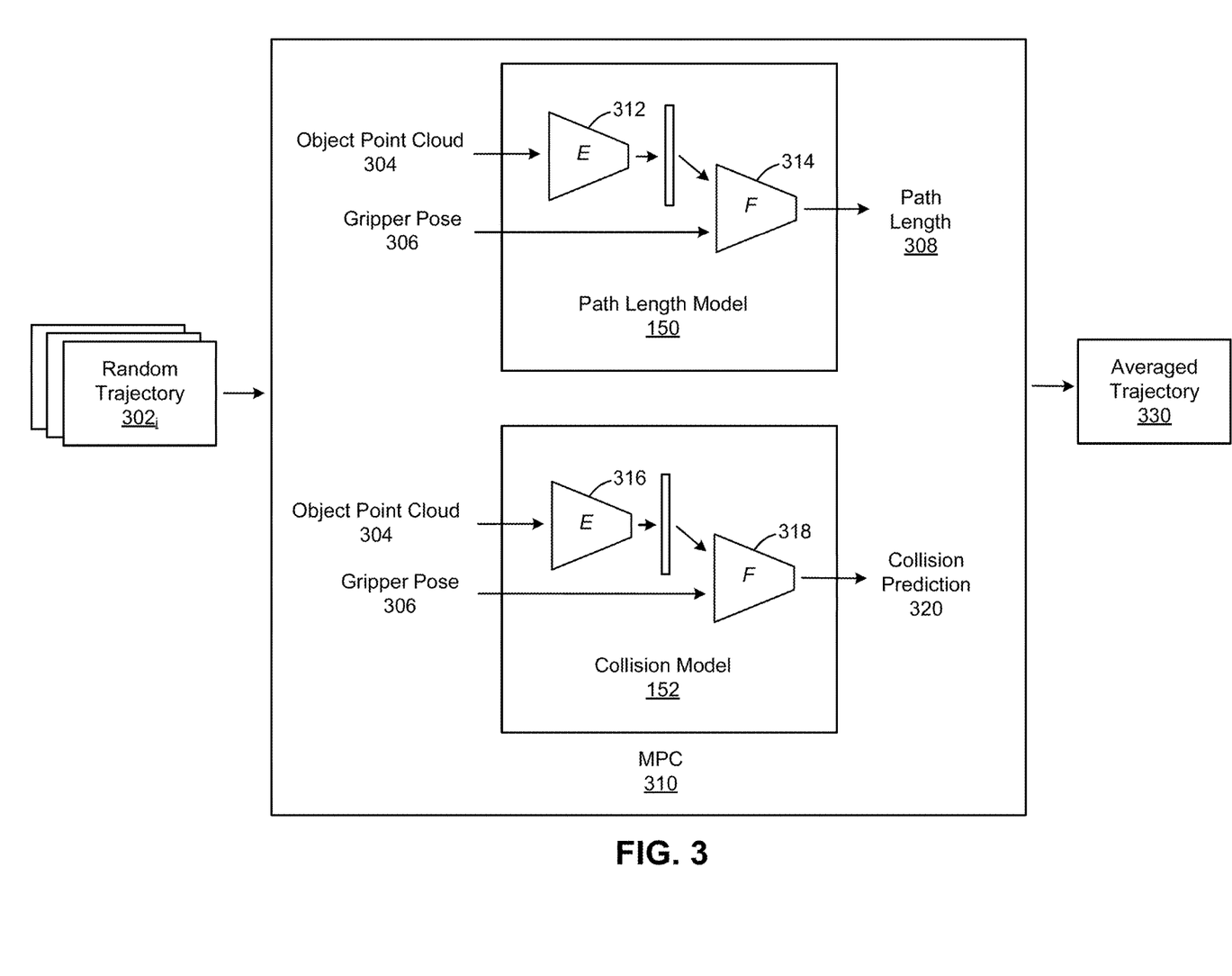
FIG. 3 illustrates an approach for controlling a robot to grasp an object using trained machine learning models, according to various embodiments.

FIG. 3 illustrates an approach for controlling a robot to grasp an object using trained machine learning models, according to various embodiments. As shown, to control the robot 160, the robot control application 146 first generates a sample of random trajectories 302, (referred to herein collectively as trajectories 302 and individually as a trajectory 302). Each trajectory 302 includes a randomly generated sequence of configurations of the robot 160 that extends a fixed number of time steps (e.g., 30 time steps) into the future. Notably, the trajectories 302 do not distinguish between grasp poses and motion planning, unlike conventional two-step approaches for controlling a robot to grasp an object. Using trajectories, the path length model 150 can be trained to jointly learn moving to a position of grasping an object and also a path to the object, in contrast to the conventional two-step approaches, described above.

The robot control application 146 inputs the random trajectories 302 into a model predictive control (MPC) technique 310 that applies the path length model 150 and the collision model 152 to evaluate each trajectory 302. The MPC technique 310 generates a new, averaged trajectory 330 that is a weight average of the trajectories 302 based on the evaluations of the trajectories 302.

Illustratively, the path length model 150 includes a feature embedding module 312 and a path length prediction module 314. In some embodiments, the feature embedding module 312 can be one or more intermediate layers of an artificial neural network, such as a point-based network, and the path length prediction module 314 can also be one or more layers of the neural network, such as a final fully connected layer.

As shown, the feature embedding module 312 takes as input the state of an object, represented by a point cloud 304 associated with the object (also referred to herein as the "object point cloud 304"), and generates features that are input, along with a gripper pose 306, into the path length prediction module 314. The object point cloud 304 can be extracted from a point cloud of the environment that is captured via one or more depth cameras, such as camera(s) using time-of-flight sensors, LIDAR sensors, etc. In some embodiments, the object is first detected in images captured by one or more RGB cameras that capture the scene from a location next to the robot, and corresponding points are extracted (i.e., segmented) from a point cloud of the environment to obtain the object point cloud 304.

As described, the path length prediction module 314 takes as input features that are output by the feature embedding module 312 and a gripper pose 306, and generates a prediction of a path length 308. The path length 308 is a value indicating how far the input configuration of the robot is from the task space goal of grasping the object, and the path length 308 penalizes configurations of the robot 160 that are far away from the object.

In some embodiments, the feature embedding module 312 and the path length prediction module are trained together, but executed separately after the path length model 150 is trained. In such cases, the computationally-expensive feature embedding module 312 is only executed at time steps when a new object point cloud is received. At other time steps, the path length prediction module 314 is executed with a current gripper pose 306 and features that were previously output by the feature embedding module 312.

Having the path length model 150 is not sufficient to control a robot, because the path length model 150 does not account for collisions between gripper poses and an object of interest. As shown, a collision model 152 is used to account for such collisions. The collision model 152 includes a feature embedding module 316 and a collision prediction module 318. The feature embedding module 316 takes as input the object point cloud 304 and generates features that are input, along with the gripper pose 306, into the collision prediction module 318. The collision prediction module 318 generates a collision prediction 320 that is a classification of whether a current pose of the robot 160 collides with the object represented by the object point cloud 304.

The MPC technique 310 evaluates each trajectory 302 using the path length model 150 and the collision model 152. As discussed in greater detail below, the MPC technique 310 computes a grasp cost for each trajectory 302 as a sum of the inverse of the path length 308 output by the path length model 150 and the collision prediction 320 output by the collision model 152. For example, grasp cost could be lowest when the robot grasps the object and higher elsewhere. Then, the MPC technique 310 generates the averaged trajectory 330 as a weighted average of the trajectories 302 that optimizes the grasp cost. Any technically feasible MPC technique 310, such as a reactive model-based planner (MPPI) technique, can be employed in some embodiments to generate the averaged trajectory 330. For example, the Stochastic Tensor Optimization for Robot Motion (STORM) technique can be used to optimize the grasp cost along with other terms to generate the averaged trajectory 330. STORM is a MPPI optimizer that can be used to optimize the grasp cost along with other terms that ensure relatively smooth and collision-free motions.

More formally, the path length model 150 is trained to predict a kinematically feasible trajectory for a robot to grasp an object. The object grasping task can be encoded in a learned value function. In some embodiments, the path length model 150 is an artificial neural network, such as the point-based network described above, that is trained to take as input (1) a segmented partial point cloud $P \in \mathbb{R}^{N \times 3}$ of an object from a single view, and (2) the gripper pose $g \in SE(3)$, 306, and to output the path length 308. The gripper pose 306 implicitly encodes the pose of the entire robot. In some other embodiments, an entire pose of the robot can be taken as input rather than the gripper pose 306. As described, the path length model 150 predicts a value function that describes how far the robot is from the task space goal, i.e., the path length 308 to a grasp of the object of interest. The path length of a gripper pose $V(g_t)$ can be defined as the cumulative sum of the average distance between two adjacent gripper poses, which can be expressed by:

$$V(g_t) = \sum_{i=0}^{t-1} \frac{1}{m} \sum_{x \in M} \|(R_i x + T_i) - (R_{i+1} x + T_{i+1})\|, \quad (1)$$

where $g_t$ is the gripper pose at time t, $R_i$ is the rotation of the i-th gripper pose in a trajectory, $T_i$ is the translation of the i-th gripper pose in a trajectory, m is the number of keypoints of the gripper, and M is the set of keypoints of the gripper. In some embodiments, the value of $V(g_t)$ is highest (e.g., 1) when the robot grasps an object and decreases as the distance of the robot from the object increases.

In some embodiments, given a partial point cloud P of an object and a gripper pose g, the value function of equation (1) first uses the point cloud encoder E, 312, to encode a feature embedding $f = E(p) \in \mathbb{R}^d$ of the point cloud, where d is the dimension of the feature. Then, the point cloud feature f and the gripper pose g can be concatenated and passed to the path length prediction module F, 314, to predict the path length V(g)=F(f, g) between the gripper pose g and the object of interest. In some embodiments, the value of V(g) can be highest when the robot is at a grasp of an object and lower otherwise.

In some embodiments, the model trainer 116 can train the path length model 150 using simulated trajectories and associated path length values as training data. During a data collection phase, the model trainer 116 generates the simulated trajectories to grasp an object from various starting configurations to various grasp positions. The simulated trajectories can be generated in any technically feasible manner, such as using rapidly exploring random trees (RRT), a configuration-space planner. Once the simulated trajectories have been generated, the model trainer 116 computes the path length of each trajectory. Thereafter, during a training phase, the model trainer 116 trains the path length model 150 using the simulated trajectories and the path length values as training data. In some embodiments, training the path length model 150 includes minimizing the following loss function:

$$\mathcal{L}_{path-length} = \|V((g)-V(g)_{GT}\|_1, \quad (2)$$

where V(g) is the predicted path length and V(g)$_{GT}$ is the ground truth path length that is computed during the data collection phase. The loss function of equation (2) forces the path length model 150 to learn to predict path lengths that are as close as possible to the ground truth path lengths.

As described, the collision model 152 is used to account for collisions between gripper poses and an object of interest. Given a partial point cloud P of an object and a gripper pose g, the collision model can use the point cloud encoder E to encode the point cloud feature f=E(p)∈ $\mathbb{R}^d$. Then, the point cloud feature f and the gripper pose g can be concatenated and passed to the collision model 152 to predict a probability p(g) of the gripper pose g being in collision with the object. In some embodiments, the collision model 152 is trained using simulated trajectories in a similar manner as the path length model 150, described above, except the following binary cross-entropy loss function is minimized during training of the collision model 152:

$$\mathcal{L}_{collision} = p^* \log p(g) + (1-p^*)\log(1-p(g)), \quad (3)$$

where p(g) is the predicted collision probability and p* is the ground truth.

Given the path length value function V(g) provided by the path length model 150 and the collision prediction p(g) provided by the collision model 152, the robot control application 146 can compute a grasp cost C$_{grasp}$ as:

$$C_{grasp}(g_t) = (1-V(g_t) + C(g_t) \quad (4)$$

where C(g$_t$) is the collision prediction computed by thresholding p(g$_t$)≥0.5. As described, the grasp cost C$_{grasp}$ can be optimized using a MPC technique, such as an MPPI technique. For example, in some embodiments, the STORM technique can be used to optimize the grasp cost C$_{grasp}$(g$_t$) along with other cost terms C$_{storm}$ of the STORM technique to generate smooth collision-free motions:

$$\min_{\dot{x}_t \in [0,H]} C_{storm}(q) + C_{grasp}. \quad (5)$$

Figure 4:
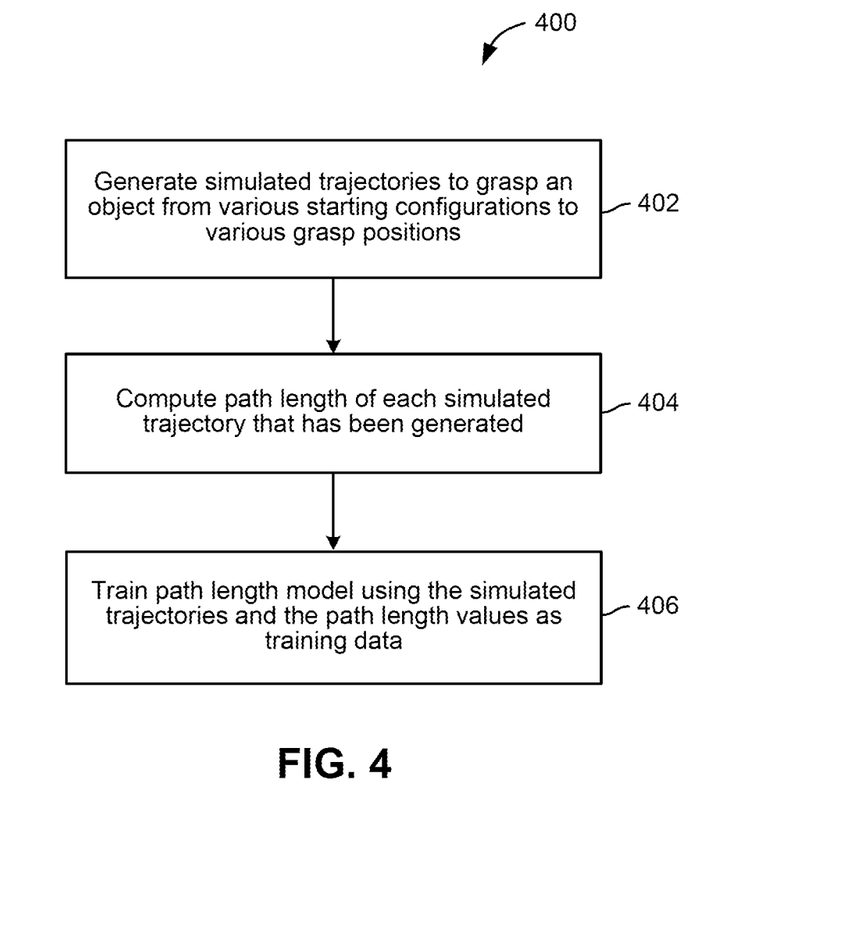
FIG. 4 is a flow diagram of method steps for training a machine learning model to predict values for robot trajectories used by a robot when the robot is grasping an object, according to various embodiments.

FIG. 4 is a flow diagram of method steps for training a machine learning model to predict values for robot trajectories used by a robot when the robot is grasping an object, according to various embodiments. Although the method steps are described in conjunction with the systems of FIGS. 1-2, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, a method 400 begins at step 402, where the model trainer 116 generates simulated trajectories for a robot to grasp an object from various starting configurations to various grasp positions. In some embodiments, the simulated trajectories can be generated in any technically feasible manner. For example, in some embodiments, the model trainer 116 can utilize rapidly exploring random trees (RRT), a configuration-space planner, to generate the simulated trajectories.

At step 404, the model trainer 116 computes the path length of each simulated trajectory that has been generated. As described, the path length indicates how far the current robot configuration is from grasping the object.

At step 406, the model trainer 116 trains the path length model 150 using the simulated trajectories and the path length values as training data. In some embodiments, training the path length model 150 includes minimizing the loss function of equation (2), described above in conjunction with FIG. 3.

Subsequent to training, the path length model 150 can be used, along with the collision model 152, to control a robot to grasp an object. The robot that is controlled is the same robot for which the path length model 150 was trained, but the object can be a new object that was not seen during training. Although FIG. 4 is described with respect to training the path length model 150, in some embodiments, the collision model 152 can be trained a similar manner using the simulated trajectories, except the binary cross-entropy loss function of equation (3) is minimized during training of the collision model 152, rather than the loss function of equation (2).

Figure 5:
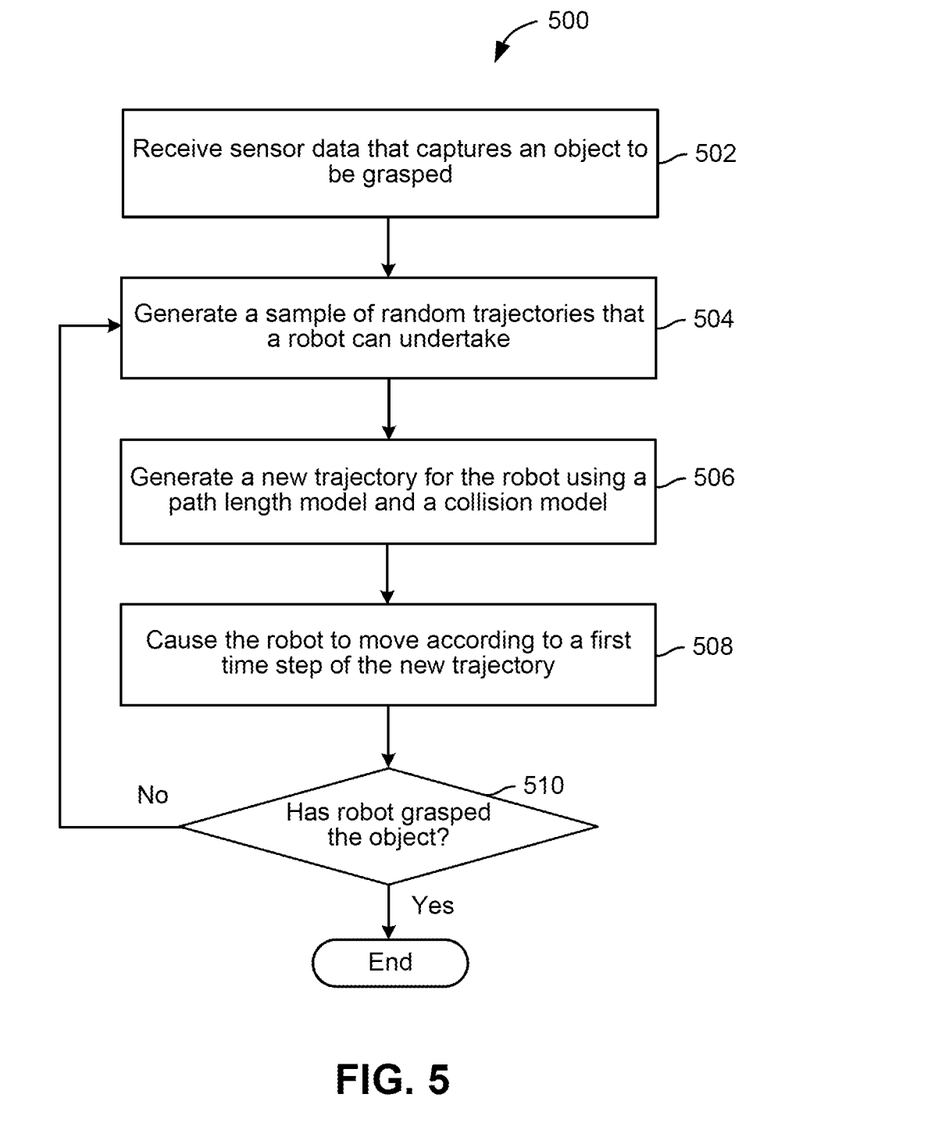
FIG. 5 is a flow diagram of method steps for controlling a robot to grasp an object, according to various embodiments.

FIG. 5 is a flow diagram of method steps for controlling a robot to grasp an object, according to various embodiments. Although the method steps are described in conjunction with the systems of FIGS. 1-2, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, a method 500 begins at step 502, where the robot control application 146 receives sensor data that captures an object to be grasped. In some embodiments, the sensor data can include (1) a depth image that includes a point cloud, and (2) a color image. In such cases, instance segmentation can be applied to determine the object within the color image, which can then be combined with the depth image to extract a partial point cloud corresponding to the object (e.g., object point cloud).

At step 504, the robot control application 146 generates a sample of random trajectories that the robot 160 can undertake. Each random trajectory includes a randomly generated sequence of configurations of the robot 160 that extends a fixed number of time steps (e.g., 30 time steps) into the future. Any suitable number of random trajectories (e.g., a sample of 500 random trajectories) can be generated in some embodiments.

At step 506, the robot control application 146 generates a new trajectory for the robot 160 using the path length model 150 and the collision model 152. In some embodiments, the robot control application 146 applies a MPC technique that optimizes a grasp cost of each random trajectory based on an evaluation of the sequence of robot configurations in that trajectory using the path length model 150 and the collision model 152. As described, the grasp cost for each random trajectory can be a sum of the inverse of a path length output by the path length model 150 and a collision prediction output by the collision model. In some embodiments, the STORM technique can be used to optimize the grasp cost. Optionally, other cost terms, such as the cost terms in STORM that ensure relatively smooth and collision-free motions, can also be optimized along with the grasp cost. In some embodiments, the new trajectory is generated as a weighted average of the random trajectories. In such cases, each of the random trajectories can be weighted based on the grasp cost and (optionally) other cost terms.

At step 608, the robot control application 146 causes the robot 160 to move according to a first time step of the new trajectory. Each new trajectory can include multiple (e.g., 30) time steps so that the robot 160 continuously moves towards the object, but only a first time step is used to control the robot 160. In some embodiments, the robot control application 146 can transmit command signals to joints of the robot 160, or to a controller of those joints, to cause the robot to move according to the first time step of the averaged trajectory.

At step 610, if the robot has not grasped the object, then the method 600 returns to step 602, where the robot control application 146 receives additional sensor data. Accordingly, the robot can be dynamically controlled in real time to react to movements of the object while continuing towards grasping the object. Notably, the reactions can be determined in less time than the conventional two-step approaches, described above, because the path length model 150 and the collision model 152 can execute relatively quickly after training. On the other hand, if the robot has grasped the object, then the method 600 ends.

In sum, improved techniques are disclosed for controlling a robot to grasp objects using machine learning models. A path length model is trained to take a point cloud representing an object and a configuration of a robot as inputs and to output a path length indicating how far the configuration is from grasping the object. A collision model is trained to take the point cloud representing the object and the configuration of the robot as inputs and to output whether the robot is colliding with the object. Subsequent to training, at each of a number of time steps until the robot grasps an object, an MPC technique is applied to evaluate a sample of random trajectories using the path length model and the collision model. The MPC technique generates a new trajectory that is a weighted average of the random trajectories based on the evaluation results. Thereafter, the robot is controlled to move according to a first time step in the new trajectory.

At least one technical advantage of the disclosed techniques relative to the prior art is that the disclosed techniques are substantially more computationally efficient relative to prior art approaches, which enables the disclosed techniques to be used to control robots when those robots are grasping objects that are moving relative to the robots, such as objects on a conveyor belt or in a production line. These technical advantages represent one or more technological improvements over prior art approaches.

1. In some embodiments, a computer-implemented method for controlling a robot comprises receiving sensor data associated with an environment that includes an object, applying a machine learning model to a portion of the sensor data associated with the object and one or more trajectories of motion of the robot to determine one or more path lengths of the one or more trajectories, generating a new trajectory of motion of the robot based on the one or more trajectories and the one or more path lengths, and causing the robot to perform one or more movements based on the new trajectory.

2. The computer-implemented method of clause 1, wherein the one or more movements are associated with grasping the object.

3. The computer-implemented method of clauses 1 or 2, further comprising applying another machine learning model to the portion of the sensor data and the one or more trajectories to determine whether the one or more trajectories cause the robot to collide with the object.

4. The computer-implemented method of any of clauses 1-3, wherein applying the machine learning model comprises performing one or more model predictive control (MPC) operations using the machine learning model.

5. In some embodiments, a computer-implemented method for controlling a robot comprises generating a plurality of first trajectories, for each trajectory included in the plurality of first trajectories, applying a first machine learning model to the trajectory and sensor data associated with an object to generate a path length associated with the trajectory, generating a second trajectory based on the plurality of first trajectories and the path lengths associated with the plurality of first trajectories, and causing the robot to perform one or more movements based on the second trajectory.

6. The computer-implemented method of clause 5, further comprising for each trajectory included in the plurality of first trajectories, applying a second machine learning model to the trajectory and the sensor data associated with the object to determine whether the robot collides with the object when moving in accordance with the trajectory, wherein the second trajectory is further generated based on whether the robot collides with the object when moving in accordance with the plurality of first trajectories.

7. The computer-implemented method of clauses 5 or 6, wherein applying the machine learning model comprises performing one or more model predictive control (MPC) operations using the machine learning model.

8. The computer-implemented method of any of clauses 5-7, further comprising generating a plurality of third trajectories for the robot to grasp one or more other objects, determining path lengths associated with the plurality of third trajectories, and training the first machine learning model to generate path lengths based on the plurality of third trajectories and the path lengths associated with the plurality of third trajectories.

9. The computer-implemented method of any of clauses 5-8, wherein the plurality of first trajectories comprises a plurality of random trajectories.

10. The computer-implemented method of any of clauses 5-9, wherein generating the second trajectory comprises performing a weighted average of the plurality of first trajectories based on the path lengths associated with the plurality of first trajectories.

11. The computer-implemented method of any of clauses 5-10, wherein the robot is caused to perform the one or more movements based on a first time step of the second trajectory.

12. The computer-implemented method of any of clauses 5-11, wherein the sensor data comprises at least one of depth data or color image data.

13. In some embodiments, one or more non-transitory computer-readable media storing instructions that, when executed by at least one processor, cause the at least one processor to perform the steps of generating a plurality of first trajectories, for each trajectory included in the plurality of first trajectories, applying a first machine learning model to the trajectory and sensor data associated with an object to generate a path length associated with the trajectory, generating a second trajectory based on the plurality of first trajectories and the path lengths associated with the plurality of first trajectories, and causing the robot to perform one or more movements based on the second trajectory.

14. The one or more non-transitory computer-readable media of clause 13, wherein the instructions, when executed by the at least one processor, further cause the at least one processor to perform the steps of for each trajectory included in the plurality of first trajectories, applying a second machine learning model to the trajectory and the sensor data associated with the object to determine whether the robot collides with the object when moving in accordance with the trajectory, wherein the second trajectory is further generated based on whether the robot collides with the object when moving in accordance with the plurality of first trajectories.

15. The one or more non-transitory computer-readable media of clauses 13 or 14, wherein applying the machine learning model comprises performing one or more Stochastic Tensor Optimization for Robot Motion (STORM) operations using the machine learning model.

16. The one or more non-transitory computer-readable media of any of clauses 13-15, wherein the instructions, when executed by the at least one processor, further cause the at least one processor to perform the steps of generating a plurality of third trajectories for the robot to grasp one or more other objects, determining path lengths associated with the plurality of third trajectories, and training the first machine learning model to generate path lengths based on the plurality of third trajectories and the path lengths associated with the plurality of third trajectories.

17. The one or more non-transitory computer-readable media of any of clauses 13-16, wherein the plurality of third trajectories are generated by performing one or more configuration-space planner operations.

18. The one or more non-transitory computer-readable media of any of clauses 13-17, wherein generating the second trajectory comprises performing a weighted average of the plurality of first trajectories based on the path lengths associated with the plurality of first trajectories.

19. The one or more non-transitory computer-readable media of any of clauses 13-18, wherein generating the second trajectory comprises computing a weighted average of the plurality of first trajectories, wherein, in the weighted average, each trajectory included in the plurality of first trajectories is weighted by a cost associated with the path associated with the trajectory.

20. The one or more non-transitory computer-readable media of any of clauses 13-19, wherein the robot is caused to perform the one or more movements based on a first time step of the second trajectory.

21. The one or more non-transitory computer-readable media of any of clauses 13-20, wherein the sensor data comprises at least one of depth data or color image data.

22. In some embodiments, a system comprises one or more memories storing instructions, and one or more processors that are coupled to the one or more memories and, when executing the instructions, are configured to generate a plurality of first trajectories, for each trajectory included in the plurality of first trajectories, apply a first machine learning model to the trajectory and sensor data associated with an object to generate a path length associated with the trajectory, generate a second trajectory based on the plurality of first trajectories and the path lengths associated with the plurality of first trajectories, and cause the robot to perform one or more movements based on the second trajectory.

23. The system of clause 22, wherein the one or more processors, when executing the instructions, are further configured to for each trajectory included in the plurality of first trajectories, apply a second machine learning model to the trajectory and the sensor data associated with the object to determine whether the robot collides with the object, wherein the second trajectory is further generated based on whether the robot collides with the object when moving in accordance with the plurality of first trajectories.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   receiving sensor data associated with an environment that includes an object;
   applying a machine learning model to a portion of the sensor data associated with the object and one or more trajectories of motion of the robot to determine one or more path lengths of the one or more trajectories;
   generating a new trajectory of motion of the robot based on the one or more trajectories and the one or more path lengths; and
   causing the robot to perform one or more movements based on the new trajectory.

2. The computer-implemented method of claim 1, wherein the one or more movements are associated with grasping the object.

3. The computer-implemented method of claim 1, further comprising applying another machine learning model to the portion of the sensor data and the one or more trajectories to determine whether the one or more trajectories cause the robot to collide with the object.

4. The computer-implemented method of claim 1, wherein applying the machine learning model comprises performing one or more model predictive control (MPC) operations using the machine learning model.

5. A computer-implemented method for controlling a robot, the method comprising:
   generating a plurality of first trajectories;
   for each trajectory included in the plurality of first trajectories, applying a first machine learning model to the trajectory and sensor data associated with an object to generate a path length associated with the trajectory;
   generating a second trajectory based on the plurality of first trajectories and the path lengths associated with the plurality of first trajectories; and
   causing the robot to perform one or more movements based on the second trajectory.

6. The computer-implemented method of claim 5, further comprising:
   for each trajectory included in the plurality of first trajectories, applying a second machine learning model to the trajectory and the sensor data associated with the object to determine whether the robot collides with the object when moving in accordance with the trajectory,
   wherein the second trajectory is further generated based on whether the robot collides with the object when moving in accordance with the plurality of first trajectories.

7. The computer-implemented method of claim 5, wherein applying the machine learning model comprises performing one or more model predictive control (MPC) operations using the machine learning model.

8. The computer-implemented method of claim 5, further comprising:
   generating a plurality of third trajectories for the robot to grasp one or more other objects;
   determining path lengths associated with the plurality of third trajectories; and
   training the first machine learning model to generate path lengths based on the plurality of third trajectories and the path lengths associated with the plurality of third trajectories.

9. The computer-implemented method of claim 5, wherein the plurality of first trajectories comprises a plurality of random trajectories.

10. The computer-implemented method of claim 5, wherein generating the second trajectory comprises performing a weighted average of the plurality of first trajectories based on the path lengths associated with the plurality of first trajectories.

11. The computer-implemented method of claim 5, wherein the robot is caused to perform the one or more movements based on a first time step of the second trajectory.

12. The computer-implemented method of claim 5, wherein the sensor data comprises at least one of depth data or color image data.

13. One or more non-transitory computer-readable media storing instructions that, when executed by at least one processor, cause the at least one processor to perform the steps of:
   generating a plurality of first trajectories;
   for each trajectory included in the plurality of first trajectories, applying a first machine learning model to the trajectory and sensor data associated with an object to generate a path length associated with the trajectory;

generating a second trajectory based on the plurality of first trajectories and the path lengths associated with the plurality of first trajectories; and causing the robot to perform one or more movements based on the second trajectory.

14. The one or more non-transitory computer-readable media of claim 13, wherein the instructions, when executed by the at least one processor, further cause the at least one processor to perform the steps of:

for each trajectory included in the plurality of first trajectories, applying a second machine learning model to the trajectory and the sensor data associated with the object to determine whether the robot collides with the object when moving in accordance with the trajectory, wherein the second trajectory is further generated based on whether the robot collides with the object when moving in accordance with the plurality of first trajectories.

15. The one or more non-transitory computer-readable media of claim 13, wherein applying the machine learning model comprises performing one or more Stochastic Tensor Optimization for Robot Motion (STORM) operations using the machine learning model.

16. The one or more non-transitory computer-readable media of claim 13, wherein the instructions, when executed by the at least one processor, further cause the at least one processor to perform the steps of:

generating a plurality of third trajectories for the robot to grasp one or more other objects;

determining path lengths associated with the plurality of third trajectories; and training the first machine learning model to generate path lengths based on the plurality of third trajectories and the path lengths associated with the plurality of third trajectories.

17. The one or more non-transitory computer-readable media of claim 16, wherein the plurality of third trajectories are generated by performing one or more configuration-space planner operations.

18. The one or more non-transitory computer-readable media of claim 13, wherein generating the second trajectory comprises performing a weighted average of the plurality of first trajectories based on the path lengths associated with the plurality of first trajectories.

19. The one or more non-transitory computer-readable media of claim 13, wherein generating the second trajectory comprises:

computing a weighted average of the plurality of first trajectories, wherein, in the weighted average, each trajectory included in the plurality of first trajectories is weighted by a cost associated with the path associated with the trajectory.

20. The one or more non-transitory computer-readable media of claim 13, wherein the robot is caused to perform the one or more movements based on a first time step of the second trajectory.

21. The one or more non-transitory computer-readable media of claim 13, wherein the sensor data comprises at least one of depth data or color image data.

22. A system, comprising:

one or more memories storing instructions; and one or more processors that are coupled to the one or more memories and, when executing the instructions, are configured to:

generate a plurality of first trajectories, for each trajectory included in the plurality of first trajectories, apply a first machine learning model to the trajectory and sensor data associated with an object to generate a path length associated with the trajectory, generate a second trajectory based on the plurality of first trajectories and the path lengths associated with the plurality of first trajectories, and cause the robot to perform one or more movements based on the second trajectory.

23. The system of claim 22, wherein the one or more processors, when executing the instructions, are further configured to:

for each trajectory included in the plurality of first trajectories, apply a second machine learning model to the trajectory and the sensor data associated with the object to determine whether the robot collides with the object, wherein the second trajectory is further generated based on whether the robot collides with the object when moving in accordance with the plurality of first trajectories.

* * * * *